(12) United States Patent
Mi

(10) Patent No.: US 12,424,021 B2
(45) Date of Patent: Sep. 23, 2025

(54) ELECTRONIC DEVICE AND DISPLAY ASSEMBLY AND MANUFACTURING METHOD THEREFOR

(71) Applicant: HONOR DEVICE CO., LTD., Shenzhen (CN)

(72) Inventor: Yulong Mi, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/909,313

(22) PCT Filed: Jan. 11, 2022

(86) PCT No.: PCT/CN2022/071466
§ 371 (c)(1),
(2) Date: Sep. 2, 2022

(87) PCT Pub. No.: WO2022/252623
PCT Pub. Date: Dec. 8, 2022

(65) Prior Publication Data
US 2024/0185632 A1   Jun. 6, 2024

(30) Foreign Application Priority Data
May 31, 2021   (CN) .......................... 202110605538.5

(51) Int. Cl.
*G06V 40/13*   (2022.01)
*H04M 1/02*   (2006.01)

(52) U.S. Cl.
CPC ...... *G06V 40/1318* (2022.01); *G06V 40/1329* (2022.01); *H04M 1/0266* (2013.01)

(58) Field of Classification Search
CPC ........... G06V 40/1318; G06V 40/1329; H04M 1/0266; H04M 2250/12; H04M 1/026; G09F 9/30
See application file for complete search history.

(56) References Cited

U.S. PATENT DOCUMENTS

| | | | |
|---|---|---|---|
| 2020/0242320 A1 | 7/2020 | Zeng et al. | |
| 2020/0358934 A1* | 11/2020 | Huang | .................. H04N 23/56 |
| 2023/0176412 A1* | 6/2023 | Zhou | ................. G06V 40/1365 349/12 |

FOREIGN PATENT DOCUMENTS

| | | |
|---|---|---|
| CN | 201788644 U | 4/2011 |
| CN | 208654763 U | 3/2019 |
| CN | 110096128 A | 8/2019 |

(Continued)

*Primary Examiner* — Abhishek Sarma
(74) *Attorney, Agent, or Firm* — WOMBLE BOND DICKINSON (US) LLP

(57) ABSTRACT

Embodiments of this application provide an electronic device and a display assembly and a manufacturing method therefor. A light scattering layer is arranged between a base layer and a light source layer. An opening is provided on the light scattering layer. A projection region of a light-emitting layer on the light scattering layer covers the opening, and a projection region of a connection region between a non-light-emitting layer and the light-emitting layer on the light scattering layer is located outside the opening. In this way, a moiré pattern under a screen is effectively reduced or avoided, so that accuracy of fingerprint recognition is enhanced, thereby greatly improving use performance and user experience.

20 Claims, 14 Drawing Sheets

(56) References Cited

FOREIGN PATENT DOCUMENTS

| | | |
|---|---|---|
| CN | 210429165 U | 4/2020 |
| CN | 111507280 A | 8/2020 |
| CN | 111553331 A | 8/2020 |
| CN | 111950322 A | 11/2020 |
| CN | 212809244 U | 3/2021 |
| CN | 212846263 U | 3/2021 |
| WO | 2020103090 A1 | 5/2020 |
| WO | 2021060708 A1 | 4/2021 |

* cited by examiner

ELECTRONIC DEVICE AND DISPLAY ASSEMBLY AND MANUFACTURING METHOD THEREFOR

CROSS-REFERENCE TO RELATED APPLICATIONS

This application is a national stage of International Application No. PCT/CN2022/071466, filed on Jan. 11, 2022, which claims priority to Chinese Patent Application No. 202110605538.5, filed on May 31, 2021. The disclosures of each of the aforementioned applications are incorporated herein by reference in their entireties.

TECHNICAL FIELD

Embodiments of this application relate to the technical field of terminals, and in particular, to an electronic device and a display assembly and a manufacturing method therefor.

BACKGROUND

With the continuous upgrading of an electronic product, the electronic product such as a smart phone and a smart watch having a touch screen causes manufacturers to compete to launch differentiated products to attract consumers. One highlight in a current market is the electronic product having a fingerprint recognition function under a screen. A fingerprint recognition solution under a screen generally includes an optical fingerprint recognition solution and an ultrasonic fingerprint recognition solution. The optical fingerprint recognition has relatively high accuracy, a small device volume, and maturer and stabler performance, which is favored by the market.

The optical fingerprint recognition solution in the prior art is generally to arrange an optical fingerprint module under a display of the electronic product. The optical fingerprint module includes a sensor and a lens. The lens is located between the sensor and the display. Based on the principle of lens imaging, a light source of the optical fingerprint module is generally derived from a light-emitting unit inside the display, and at present, the display tends to be thinner and lighter. When a finger touches an upper surface of the display, a difference between a spacing between the fingerprint and the lens and a spacing between the light-emitting unit and the lens is relatively small, and the optical fingerprint module is easily focused on the light-emitting unit of the display. A moiré pattern consisting of alternating dark and bright regions is formed when a spatial frequency of the light-emitting unit approximates that of photosensitive pixels of the sensor during optical fingerprint imaging.

However, when a width of the moiré pattern approximates a width of the finger, the accuracy of the fingerprint recognition is easily reduced, which greatly affects use performance and user experience.

SUMMARY

Embodiments of this application provide an electronic device and a display assembly and a manufacturing method therefor, which effectively reduces or avoids a moiré pattern under a screen and enhances the accuracy of fingerprint recognition, thereby greatly improving use performance and user experience.

A first aspect of the embodiments of this application provides a display assembly, applicable to an electronic device having a fingerprint recognition function. The display assembly includes at least: a base layer, a light source layer, and a light scattering layer located between the base layer and the light source layer. The light source layer includes a light-emitting layer and non-light-emitting layers located on two sides of the light-emitting layer. An opening is provided on the light scattering layer. A projection region of the light-emitting layer on the light scattering layer covers the opening, and a projection region of a connection region between the non-light-emitting layer and the light-emitting layer on the light scattering layer is located outside the opening.

In the display assembly provided in the embodiments of this application, the light scattering layer is arranged between the base layer and the light source layer, the opening is provided on the light scattering layer, the projection region of the light-emitting layer on the light scattering layer covers the opening, and the projection region of the connection region between the non-light-emitting layer and the light-emitting layer on the light scattering layer is located outside the opening. Based on the principle of light scattering, when light on a side of the light-emitting layer toward the base layer is emitted from an edge of the opening, diffuse reflection occurs on the light scattering layer to form divergent light in different directions. In this way, the light scattering layer blurs the scattered light, and the image collected by the optical recognition assembly is not obviously "grainy" and is presented with evenly distributed bright spots. Therefore, optical space interference is avoided, and occurrence of an optical fingerprint moiré pattern is effectively reduced or avoided, thereby enhancing the accuracy of fingerprint recognition and greatly improving use performance and user experience.

In a possible implementation, the light scattering layer includes a transparent substrate and light scattering particles distributed in the transparent substrate. A refractive index of the light scattering particles is greater than a refractive index of the transparent substrate. In this way, the transparent substrate coated by the light scattering particles forms the light scattering layer, so as to scatter the emitted light.

In a possible implementation, a diameter of the light scattering particles ranges from 10 nm to 100 nm. The nano-scale light scattering particles are distributed in the transparent substrate, which can improve uniformity of the light scattering layer, thereby enhancing a scattering effect of the light scattering layer.

In a possible implementation, the light scattering layer includes at least one set of a first light scattering layer and a second light scattering layer that are stacked. A plurality of first protruding portions are provided on a side of the first light scattering layer close to the second light scattering layer, and a first groove is formed between two adjacent first protruding portions. A plurality of second protruding portions matching the first grooves are provided on a side of the second light scattering layer close to the first light scattering layer, a second groove is formed between two adjacent second protruding portions, and the second grooves match the first protruding portions. A refractive index of the first light scattering layer is different from a refractive index of the second light scattering layer.

In this way, a level structure having alternating high and low refractive indexes is formed by the first light scattering layer and the second light scattering layer. The light can be refracted on surfaces of concave-convex structures of the first light scattering layer and the second light scattering layer, thereby changing a propagation direction of the light and realizing the effect of light scattering.

In a possible implementation, shapes or sizes of at least some of the plurality of first protruding portions are different, and shapes or sizes of at least some of the plurality of second protruding portions are different. In this way, the surfaces of the concave-convex structures of the first light scattering layer and the second light scattering layer are in irregular shapes, which can further enhance the scattering effect of the light scattering layer.

In a possible implementation, the light source layer includes a plurality of light-emitting layers and a plurality of non-light-emitting layers. The light-emitting layers and the non-light-emitting layers are arranged at intervals. The light scattering layer includes a plurality of scattering sub-layers, and projection regions of the plurality of scattering sub-layers on the light source layer completely cover the plurality of non-light-emitting layers, and cover a part of the plurality of light-emitting layers adjacent to the plurality of non-light-emitting layers.

In a possible implementation, the light-emitting layers and the non-light-emitting layers are arranged at intervals in a first direction. A width of a projection region of each of the scattering sub-layers on each of the light-emitting layers in the first direction is greater than one fifth and less than four fifths of a width of each of the light-emitting layers in the first direction.

In a possible implementation, the light-emitting layers and the non-light-emitting layers are arranged at intervals in a second direction. A width of a projection region of each of the scattering sub-layers on each of the light-emitting layers in the second direction is greater than one fifth and less than four fifths of a width of each of the light-emitting layers in the second direction. The second direction is perpendicular to the first direction.

In a possible implementation, the display assembly further includes a middle layer. The middle layer is located between the base layer and the light source layer. A part of the middle layer is located between the light source layer and the light scattering layer, and an other part of the middle layer is located in the opening.

In a possible implementation, the middle layer includes at least one planarization layer. A part of the planarization layer is located between the light source layer and the light scattering layer, and an other part of the planarization layer is located in the opening. The planarization layer can play a role in planarizing a surface of the light scattering layer.

In a possible implementation, the middle layer includes at least two planarization layers and at least one passivation layer. The passivation layer is located between two adjacent planarization layers. One of the at least two planarization layers is located between the light source layer and the planarization layer. A part of the other of the at least two planarization layers is located between the passivation layer and the light scattering layer, and an other part of the other of the at least two planarization layers is located in the opening. The passivation layer can play the role in thermal insulation and blocking ion erosion.

In a possible implementation, the middle layer includes a first planarization layer, a second planarization layer, and a passivation layer located between the first planarization layer and the second planarization layer. A part of the first planarization layer is located between the passivation layer and the light scattering layer, and an other part of the first planarization layer is located in the opening. The second planarization layer is located between the light source layer and the passivation layer, at least one transistor is arranged in the second planarization layer, and the transistor is in contact with the passivation layer. The first planarization layer can play a role in planarizing a surface of the light scattering layer, and the second planarization layer can play a role in planarizing a surface of the passivation layer, thereby preventing uneven heights and poor flatness from causing adverse impact on the transistor.

In a possible implementation, the display assembly further includes a packaging layer. The light source layer is located between the packaging layer and the second planarization layer. The packaging layer can protect the light source layer, so as to prevent external conditions from affecting the light source layer, thereby avoiding damaging the use performance of the display assembly.

In a possible implementation, a bottom surface of the non-light-emitting layer is flush with a bottom surface of the light-emitting layer, and a top surface of the non-light-emitting layer is higher than a top surface of the light-emitting layer. An inclined portion is arranged on an end of the non-light-emitting layer close to the light-emitting layer, and a thickness of the inclined portion gradually decreases from an end away from the light-emitting layer to an end close to the light-emitting layer. In this way, an emission angle of the emitted light on a side of the light-emitting layer toward the packaging layer can be increased, thereby increasing an emission range of the emitted light.

In a possible implementation, a thickness of the light scattering layer ranges from 20 nm to 100 nm. In this way, a thickness of the display assembly can be reduced to a certain extent, which is beneficial to realize lightness and thinness of the display assembly and further beneficial to realize lightness and thinness of the electronic device having the display assembly.

A second aspect of the embodiments of this application provides an electronic device. The electronic device includes at least a middle frame, an optical recognition assembly, and any one of the above display assemblies. The optical recognition assembly is located between the display assembly and the middle frame.

In the electronic device provided in the embodiments of this application, the electronic device includes at least the display assembly. In the display assembly, the light scattering layer is arranged between the base layer and the light source layer, the opening is provided on the light scattering layer, the projection region of the light-emitting layer on the light scattering layer covers the opening, and the projection region of the connection region between the non-light-emitting layer and the light-emitting layer on the light scattering layer is located outside the opening. Based on the principle of light scattering, when light on a side of the light-emitting layer toward the base layer is emitted from an edge of the opening, diffuse reflection occurs on the light scattering layer to form divergent light in different directions. In this way, the light scattering layer blurs the scattered light, and the image collected by the optical recognition assembly is not obviously "grainy" and is presented with evenly distributed bright spots. Therefore, optical space interference is avoided, and occurrence of an optical fingerprint moiré pattern is effectively reduced or avoided, thereby enhancing the accuracy of fingerprint recognition and greatly improving use performance and user experience.

In a possible implementation, the optical recognition assembly includes a lens and a sensor. The lens is located between the display assembly and the sensor. A fingerprint detection region is arranged on the display assembly, and a projection region of the fingerprint detection region on the middle frame at least partially coincides with a projection region of the lens on the middle frame.

A third aspect of the embodiments of this application provides a method for manufacturing a display assembly. The method includes at least: providing a base layer; forming a light scattering layer on the base layer: providing an opening on the light scattering layer: and forming a light source layer above the light scattering layer, where the light source layer includes a light-emitting layer and non-light-emitting layers located on two sides of the light-emitting layer, a projection region of the light-emitting layer on the light scattering layer covers the opening, and a projection region of a connection region between the non-light-emitting layer and the light-emitting layer on the light scattering layer is located outside the opening.

According to the method for manufacturing a display assembly provided in the embodiments of this application, the light scattering layer is formed on the base layer, the opening is provided on the light scattering layer, and the light source layer is formed above the light scattering layer. The projection region of the light-emitting layer on the light scattering layer covers the opening, and the projection region of the connection region between the non-light-emitting layer and the light-emitting layer on the light scattering layer is located outside the opening. Based on the principle of light scattering, when light on a side of the light-emitting layer toward the base layer is emitted from an edge of the opening, diffuse reflection occurs on the light scattering layer to form divergent light in different directions. In this way, the light scattering layer blurs the scattered light, and the image collected by the optical recognition assembly is not obviously "grainy" and is presented with evenly distributed bright spots. Therefore, optical space interference is avoided, and occurrence of an optical fingerprint moiré pattern is effectively reduced or avoided, thereby enhancing the accuracy of fingerprint recognition and greatly improving use performance and user experience.

In a possible implementation, the forming a light scattering layer on the base layer includes: providing light scattering particles and a transparent substrate: doping the light scattering particles in the transparent substrate to form the light scattering layer; and coating the light scattering layer on the base layer. A refractive index of the light scattering particles is greater than a refractive index of the transparent substrate. In this way, the transparent substrate coated by the light scattering particles forms the light scattering layer, so as to scatter the emitted light.

In a possible implementation, the forming a light scattering layer between the base layer and the light source layer includes: providing a first light scattering layer; arranging a plurality of first protruding portions on a first surface of the first light scattering layer, where a first groove is provided between two adjacent first protruding portions: and forming a second light scattering layer on the first surface having the plurality of first protruding portions arranged thereon, so that a plurality of second protruding portions matching the first grooves and a plurality of second grooves matching the first protruding portions are formed on a side of the second light scattering layer close to the first surface. A refractive index of the first light scattering layer is different from a refractive index of the second light scattering layer.

In this way, a level structure having alternating high and low refractive indexes is formed by the first light scattering layer and the second light scattering layer. The light can be refracted on surfaces of concave-convex structures of the first light scattering layer and the second light scattering layer, thereby changing a propagation direction of the light and realizing the effect of light scattering.

In a possible implementation, the forming a light source layer above the light scattering layer includes: forming a middle layer on the light scattering layer; and forming a light source layer on the middle layer. A part of the middle layer is located between the light source layer and the light scattering layer, and an other part of the middle layer is located in the opening.

DESCRIPTIONS OF REFERENCE NUMERALS

100—Display assembly; 10—Base layer; 20—Light source layer;
201—Light-emitting layer; 202—Non-light-emitting layer; 2021—Inclined portion;
203—Connection region; 30—Light scattering layer; 31—Opening;
32—Scattering sub-layer; L1—First direction; L2—Second direction;
W1—First width; W2—Second width; W3—Third width; W4—Fourth width; W5—Fifth width; W6—Sixth width;
301—Transparent substrate; 302—Light scattering particles; 303—First light scattering layer;
3031—First surface; 3032—First protruding portion; 3033—First groove;
304—Second light scattering layer; 3041—Second protruding portion; 3042—Second groove;
40—Middle layer; 401—First planarization layer; 402—Second planarization layer;
403—Passivation layer; 50—Transistor; 60—Packaging layer;
110—Hole; 120—Fingerprint detection region; 200—Mobile phone;
21—Optical recognition assembly; 211—Lens; 212—Sensor;
22—Middle frame; 221—Border frame; 222—Metal middle plate;
23—Circuit board; 24—Battery; 25—Rear housing;
300—Finger; 400—Bright stripe; 500—Dark stripe;
600—Distorted image; 700—Bright region; and 800—Dark region.

DESCRIPTION OF EMBODIMENTS

Terms used in implementations of this application are only used for explaining the specific embodiments of this application, and are not intended to limit this application. The implementations of the embodiments of this application are described in detail below with reference to the accompanying drawings.

The embodiments of this application provide an electronic device, which may include, but is not limited to, mobile or fixed terminals having camera functions, such as a mobile phone, a tablet computer, a notebook computer, an ultra-mobile personal computer (ultra-mobile personal computer, UMPC), a hand-held computer, an intercom, a netbook, a point of sales (Point of sales, POS) machine, a personal digital assistant (personal digital assistant, PDA), a wearable device, a virtual reality device, a wireless USB flash disk, a Bluetooth speaker/headphone, or onboard factory-installed products, an automobile data recorder, a security device, and the like.

Figure 1:
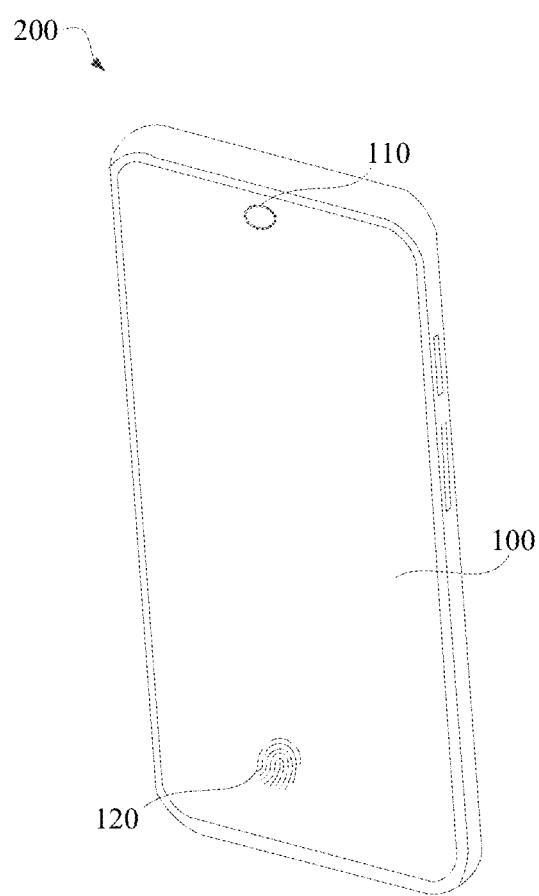
FIG. 1 is a schematic diagram of an overall structure of an electronic device according to an embodiment of this application.
Figure 2:
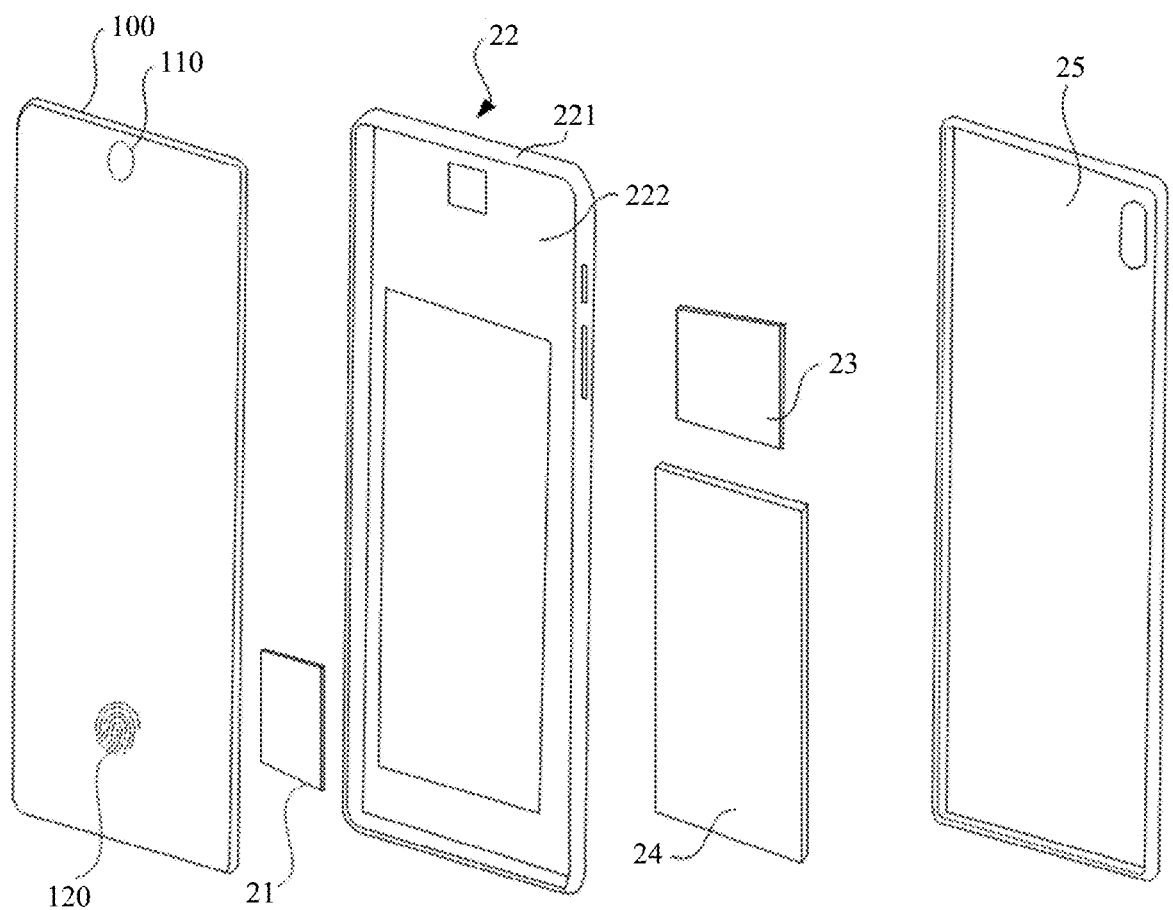
FIG. 2 is a schematic diagram of a split structure of an electronic device according to an embodiment of this application.

In the embodiment of this application, a mobile phone 200 is used as the above electronic device by way of example for description. The mobile phone 200 provided in the embodiment of this application may be a curved-display mobile phone or a flat-display mobile phone. In the embodiment of this application, the flat-display mobile phone is used as an example for description. FIG. 1 and FIG. 2 respectively show an overall structure and a split structure of the mobile phone 200. A display assembly 100 of the mobile phone 200 provided in the embodiment of this application may be a water-drop screen, a notch screen, a full screen, or a punch-hole screen (see FIG. 1). For example, a hole 110 is provided on the display assembly 100. The punch-hole screen is used as an example for description below.

Referring to FIG. 1 and FIG. 2, the mobile phone 200 may be a mobile phone 200 having a fingerprint recognition function. The mobile phone 200 may include at least a middle frame 22, an optical recognition assembly 21, and a display assembly 100. The optical recognition assembly 21 is located between the display assembly 100 and the middle frame 22, and a fingerprint detection region 120 may be arranged on a surface of a side of the display assembly 100 facing away from the optical recognition assembly 21.

Still referring to FIG. 2, the mobile phone 200 may further include a rear housing 25. The display assembly 100 and the rear housing 25 are respectively located on two sides of the middle frame 22. In addition, the mobile phone 200 may further include a battery 24 located between the middle frame 22 and the rear housing 25. The battery 24 may be arranged on a side of the middle frame 22 facing the rear housing 25 (as shown in FIG. 2), or the battery 24 may be arranged on a side of the middle frame 22 facing the display assembly 100. For example, a battery compartment (not shown in the figure) may be arranged on a side of the middle frame 22 facing the rear housing 25, and the battery 24 is mounted in the battery compartment. In some other examples, the mobile phone 200 may further include a circuit board 23. The circuit board 23 may be arranged on the middle frame 22. For example, the circuit board 23 may be arranged on a side of the middle frame 22 facing the rear housing 25 (as shown in FIG. 2), or the circuit board 23 may be arranged on a side of the middle frame 22 facing the display assembly 100. The display assembly 100 and the rear housing 25 are respectively located on two sides of the middle frame 22.

When the mobile phone 200 is a flat-display mobile phone, the display assembly 100 may be an organic light-emitting diode (Organic Light-Emitting Diode, OLED) display assembly, or may be a liquid crystal display (Liquid Crystal Display, LCD) assembly. When the mobile phone 200 is a curved-display mobile phone, the display assembly 100 may be an OLED display assembly. It should be understood that the display assembly 100 may include a display and a touch device. The display is configured to output display content to a user, and the touch device is configured to receive a touch event inputted by the user on the display assembly 100.

Still referring to FIG. 2, the middle frame 22 may include a metal middle plate 222 and a border frame 221, and the border frame 221 is arranged around a periphery of the metal middle plate 222. Generally, the border frame 221 may include a top border frame, a bottom border frame, a left border frame, and a right border frame. The top border frame, the bottom border frame, the left border frame, and the right border frame define a border frame having a square ring structure. A material of the metal middle plate 222 includes, but is not limited to, an aluminum plate, aluminum alloy, stainless steel, a steel-aluminum composite die-casting plate, titanium alloy, magnesium alloy, or the like. The border frame 221 may be a metal border frame, a ceramic border frame, or a glass border frame. When the border frame 221 is the metal border frame, a material of the metal border frame includes, but is not limited to, aluminum alloy, stainless steel, a steel-aluminum composite die-casting plate, titanium alloy, or the like. The metal middle plate 222 and the border frame 221 may be snap-fitted, welded, bonded, or integrally formed, or the metal middle plate 222 may be fixed and connected to the border frame 221 by injection molding.

The top border frame and the bottom border frame are arranged opposite to each other, and the left border frame and the right border frame are arranged opposite to each other. The top border frame is respectively connected to one end of the left border frame and one end of the right border frame by round corners, and the bottom border frame is respectively connected to an other end of the left border frame and an other end of the right border frame by round corners, to jointly form a round-cornered rectangular region. A ground plane of the rear housing is arranged in the round-cornered rectangular region and is respectively connected to the top border frame, the bottom border frame, the left border frame, and the right border frame. It may be understood that the ground plane of the rear housing may be the rear housing 25 of the mobile phone 200.

The rear housing 25 may be a metal rear housing, a glass rear housing, a plastic rear housing, or a ceramic rear housing. In the embodiment of this application, a material of the rear housing 25 is not limited and is not limited to the above examples either.

It should be noted that, in some examples, the rear housing 25 of the mobile phone 200 may be connected to the border frame 221 to form a unibody (Unibody) rear housing. For example, the mobile phone 200 may include a display assembly 100, a metal middle plate 222, and a rear housing. The rear housing may be a unibody (Unibody) rear housing formed by the border frame 221 and the rear housing 25. In this way, the circuit board 23 and the battery 24 are located in a space defined by the metal middle plate 222 and the rear housing.

It may be understood that the schematic structure in the embodiment of this application constitutes no specific limitation on the mobile phone 200. In some other embodiments of this application, the mobile phone 200 may include more or fewer components than those shown in the figure, or some components may be combined, or some components may be split, or components are arranged in different manners. The components shown in the figure may be implemented by hardware, software, or a combination of software and hardware.

Figure 3:
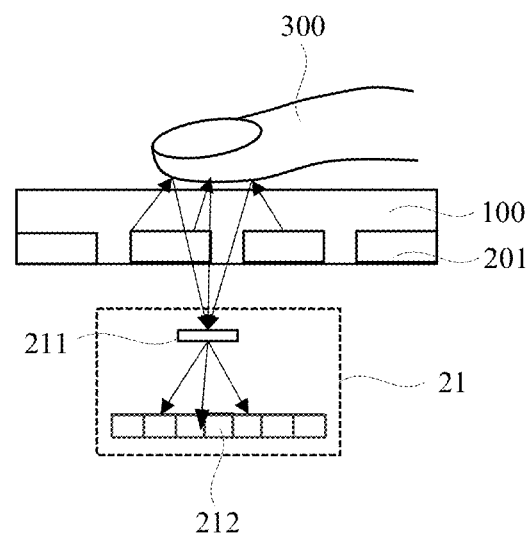
FIG. 3 is a schematic structural diagram of a display assembly and an optical recognition assembly in an electronic device according to an embodiment of this application.
Figure 4:
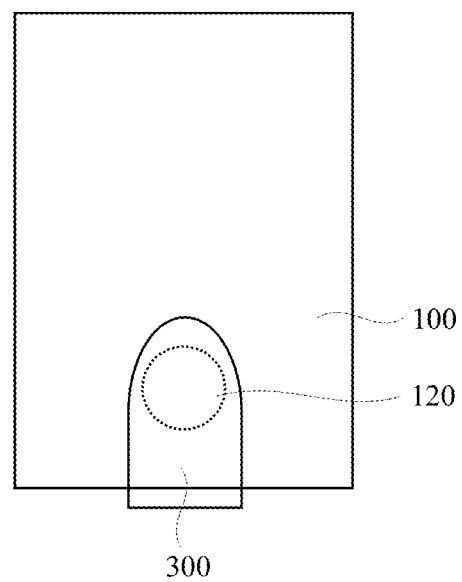
FIG. 4 is a schematic structural diagram of a fingerprint detection region in a display assembly according to an embodiment of this application.
Figure 5:
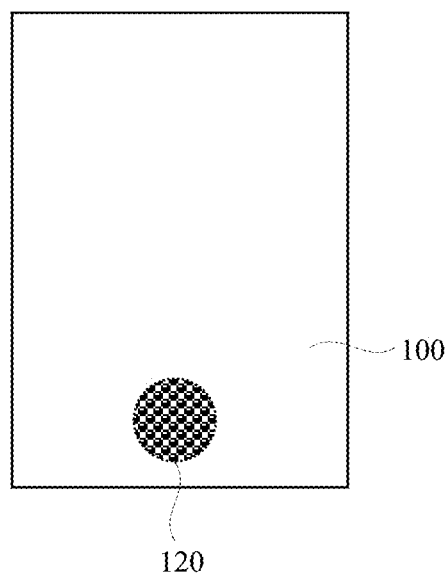
FIG. 5 is a schematic structural diagram of a fingerprint detection region in a display assembly according to an embodiment of this application.

In the embodiment of this application, as shown in FIG. 3, the optical recognition assembly 21 may include a lens 211 and a sensor 212. The lens 211 is located between the display assembly 100 and the sensor 212, and a fingerprint detection region 120 is arranged on the display assembly 100 (refer to FIG. 4 and FIG. 5). Specifically, the fingerprint detection region 120 is located on a side of the display assembly 100 attached to a finger 300. In addition, a projection region of the fingerprint detection region 120 on the middle frame 22 may at least partially coincide with a projection region of the lens 211 on the middle frame 22, so as to ensure accuracy of a fingerprint in the fingerprint detection region 120 by the optical recognition assembly 21.

When the finger 300 touches the fingerprint detection region 120, a light-emitting unit (that is to say, a light-emitting layer 201) of the display assembly 100 emits light, and the emitted light is emitted to the finger 300 by a transparent electrode of the display assembly 100. A surface of the finger 300 has a microscopic texture structure. After the light is emitted to the finger 300, a peak and a trough of the microscopic texture structure have different light intensities of reflection. After the light passes through the transparent electrode again, an optical image of the microscopic surface of the fingerprint is formed, and then fingerprint information is acquired for recognition by capture and calculation of the optical sensor 212.

Figure 6:
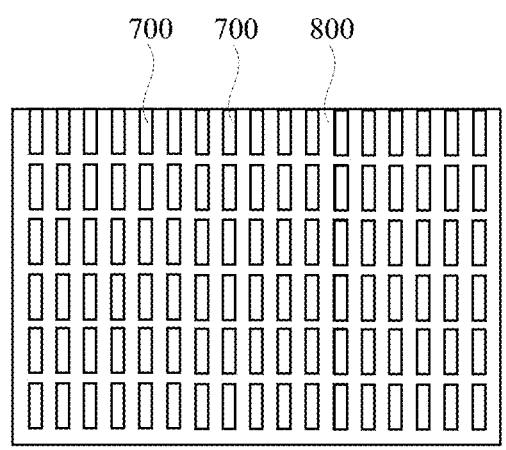
FIG. 6 is a schematic diagram of an imaging pattern of a light-emitting layer on a lens of an optical recognition assembly in a display assembly in the prior art.
Figure 7:
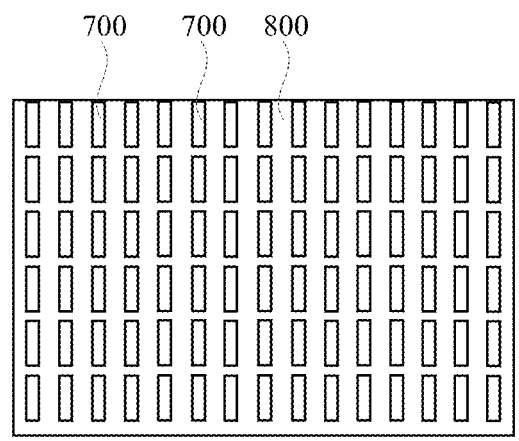
FIG. 7 is a schematic diagram of an imaging pattern of a photosensitive unit of a sensor in an optical recognition assembly in the prior art.
Figure 8:
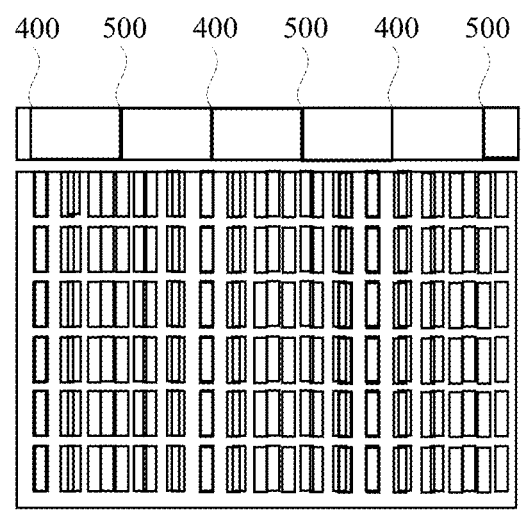
FIG. 8 is a schematic diagram of an imaging pattern of a light-emitting layer on a sensor of an optical recognition assembly in a display assembly in the prior art.

FIG. 6 shows a physical image presented by the light-emitting unit in the display assembly 100 under the lens 211, and the physical image has a moiré pattern consisting of alternating dark and bright regions in a regular shape and has a relatively high spatial frequency. Specifically, the physical image has a plurality of bright regions 700. Gaps between the plurality of bright regions 700 form a dark region 800. It should be noted that the spatial frequency is a number of cycles in which bright and dark fringes repeatedly occur or a number of repetitions of sinusoidal shading changes within a unit viewing angle. In addition, FIG. 7 shows photosensitive units of the sensor 212, and the arrangement of the photosensitive units also has the same shape as that in FIG. 6, but the spatial frequency is slightly different from each other. The spatial frequency of the pattern in FIG. 7 is slightly less than the spatial frequency of the pattern in FIG. 6. In FIG. 8, when the light-emitting unit is imaged on the sensor 212, since the sensor has photosensitive units arranged at intervals, part of image information is not collected, and overlapping images form a mode of enhancement and weakening in spatial distribution, thereby generating stripes (see bright stripes 400 and dark stripes 500 in FIG. 8) consisting of alternating dark and bright regions, that is, moiré patterns.

Figure 9:
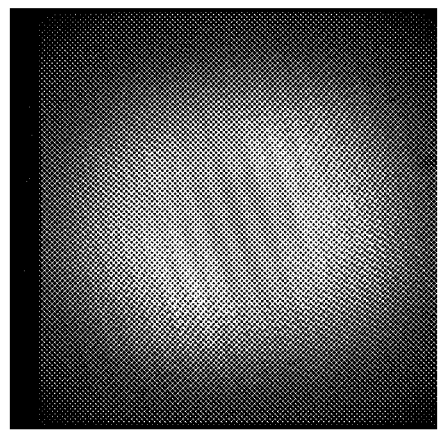
FIG. 9 is a diagram of a fingerprint image having a moiré pattern collected by an optical recognition assembly in an electronic device in the prior art.
Figure 10:
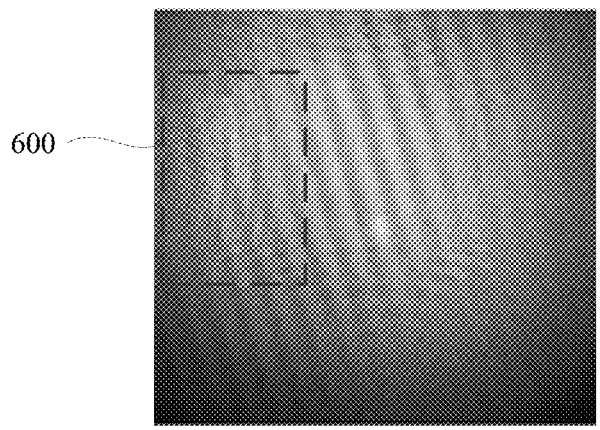
FIG. 10 is a diagram of a fingerprint image having a moiré pattern collected by an optical recognition assembly in an electronic device in the prior art.
Figure 11:
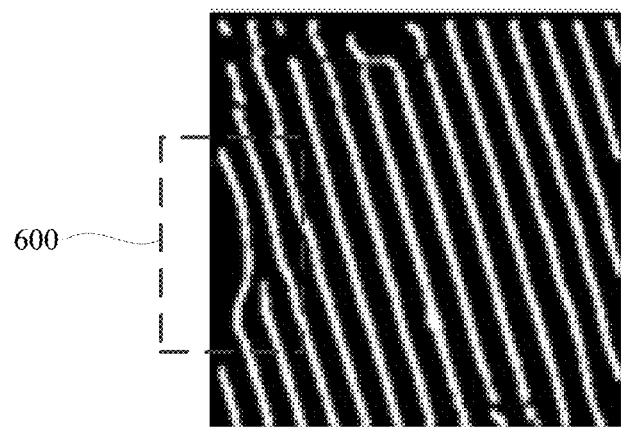
FIG. 11 is a diagram of a distorted fingerprint image obtained by an optical recognition assembly in an electronic device by optical calculation in the prior art.

It should be noted that when the imaging pattern in FIG. 6 and the imaging pattern in FIG. 7 are arranged in a same direction, vertical stripes are formed, and when the two imaging patterns are at a certain angle, diagonal stripes are formed. In addition, due to optical diffuse reflection on the fingerprint surface, a direction of each light path is not consistent, and therefore in practical application scenarios, irregular stripes are generally presented. Besides, a different image effect may be seen from a different viewing angle. For example, as shown in FIG. 9, the moiré patterns having a clear boundary between the bright region and the dark region are formed, and the image is obviously "grainy". Alternatively, as shown in FIG. 10, the fingerprint image having the moiré patterns is presented with unevenly distributed bright spots, and a distorted image 600 is produced in the image. FIG. 11 shows a distorted fingerprint image obtained by the optical recognition assembly 21 by optical calculation, and the optical recognition assembly 21 cannot accurately recognize a user fingerprint forming the distorted image 600.

Since the optical recognition assembly 21 draws the fingerprint image by calculating the feature of brightness and darkness of the image, when the moiré image is similar to the fingerprint image, the image of the fingerprint itself cannot be recognized. As a result, the user fingerprint is difficult to be recognized, which reduces the accuracy of the fingerprint recognition, thereby reducing use performance and user experience.

Based on this, according to the display assembly 100 provided in the embodiments of this application, in the display assembly 100, the light scattering layer 30 is arranged between the base layer 10 and the light source layer 20, the opening 31 is provided on the light scattering layer 30, the projection region of the light-emitting layer 201 on the light scattering layer 30 covers the opening 31, and the projection region of the connection region 203 between the non-light-emitting layer 202 and the light-emitting layer 201 on the light scattering layer 30 is located outside the opening 31. Based on the principle of light scattering, when light on a side of the light-emitting layer 201 toward the base layer 10 is emitted from an edge of the opening 31, diffuse reflection occurs on the light scattering layer 30 to form divergent light in different directions. In this way, the light scattering layer 30 blurs the scattered light, and the image collected by the optical recognition assembly 21 is not obviously "grainy" and is presented with evenly distributed bright spots. Therefore, optical space interference is avoided, and occurrence of an optical fingerprint moiré pattern is effectively reduced or avoided, thereby enhancing the accuracy of fingerprint recognition and greatly improving use performance and user experience.

The specific structure of the display assembly 100 and the method for manufacturing a display assembly 100 are described in detail below with reference to the accompanying drawings.

Figure 12:
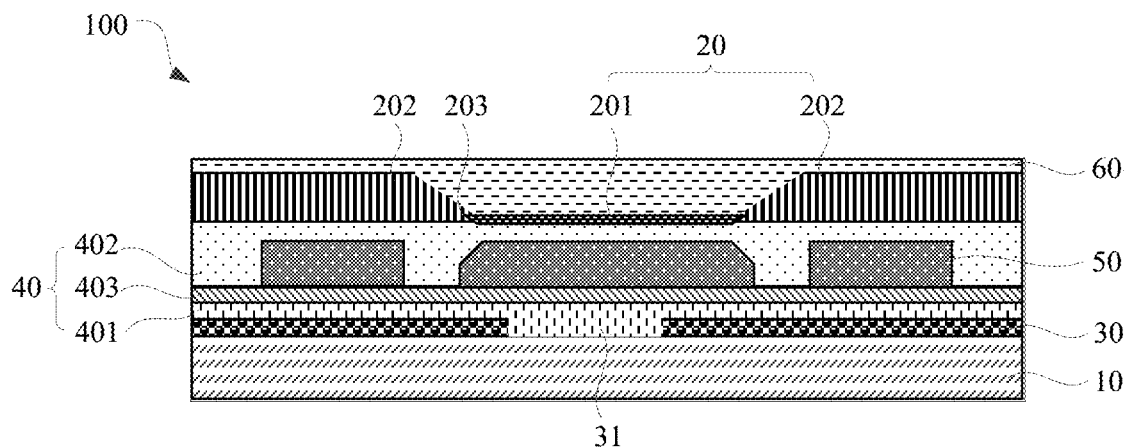
FIG. 12 is a schematic structural diagram of a display assembly in an electronic device according to an embodiment of this application.
Figure 13:
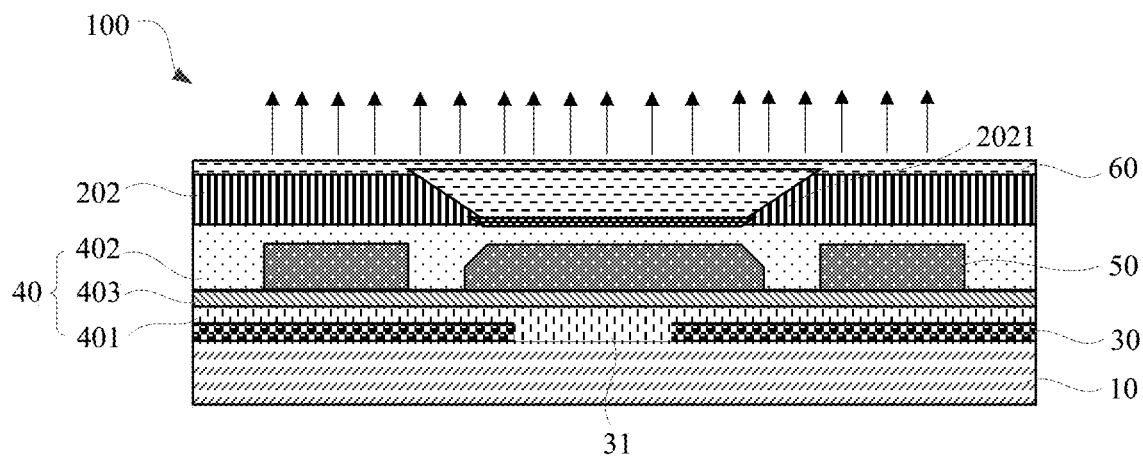
FIG. 13 is a schematic light-emitting diagram of a display assembly in an electronic device according to an embodiment of this application.

As shown in FIG. 12 or FIG. 13, the display assembly 100 provided in the embodiment of this application may include at least a base layer 10, a light source layer 20, and a light scattering layer 30 located between the base layer 10 and the light source layer 20. The light source layer 20 may include a light-emitting layer 201 and non-light-emitting layers 202 on two sides of the light-emitting layer 201. Specifically, in FIG. 13, black arrows show light exit directions of the light source layer 20.

In the embodiment of this application, an opening 31 may be provided on the light scattering layer 30, a projection region of the light-emitting layer 201 on the light scattering layer 30 covers the opening 31, and a projection region of a connection region 203 between the non-light-emitting layer 202 and the light-emitting layer 201 on the light scattering layer 30 is located outside the opening 31. Since the light scattering layer 30 can play the role of homogenizing light, when light on a side of the light-emitting layer 201 toward the base layer 10 is emitted from an edge of the opening 31, diffuse reflection occurs on the light scattering layer 30 to form divergent light in different directions. In this way, the light scattering layer 30 blurs the scattered light, and a continuous image is formed on the non-light-emitting layer 202 of the display assembly 100, thereby avoiding the spatial similarity between the light-emitting layer 201 of the display assembly 100 and the photosensitive units of the sensor 212. The image collected by the optical recognition assembly 21 is not obviously "grainy" and is presented with evenly distributed bright spots. Therefore, optical space interference is avoided, and occurrence of an optical fingerprint moiré pattern is effectively reduced or avoided, thereby enhancing the accuracy of fingerprint recognition and greatly improving use performance and user experience.

It should be noted that, in the embodiment of this application, the projection region of the light-emitting layer 201 on the light scattering layer 30 may completely cover the opening 31.

In the embodiment of this application, as shown in FIG. 12, the display assembly 100 may further include a middle layer 40. The middle layer 40 is located between the base layer 10 and the light source layer 20. A part of the middle layer 40 is located between the light source layer 20 and the light scattering layer 30, and an other part of the middle layer 40 is located in the opening 31.

Specifically, the middle layer 40 may include at least one planarization layer. A part of the planarization layer is located between the light source layer 20 and the light scattering layer 30, and an other part of the planarization layer is located in the opening 31. The planarization layer can play a role in planarizing a surface of the light scattering layer 30.

Further, in some embodiments, the middle layer 40 may include at least two planarization layers and at least one passivation layer. The passivation layer is located between two adjacent planarization layers. One of the at least two planarization layers is located between the light source layer 20 and the planarization layer, a part of the other of the at least two planarization layers is located between the passivation layer and the light scattering layer 30, and an other part of the other of the at least two planarization layers is located in the opening 31. The passivation layer can play the role in thermal insulation and blocking ion erosion.

For example, referring to FIG. 12, the middle layer 40 may include a first planarization layer 401, a second planarization layer 402, and a passivation layer 403 between the first planarization layer 401 and the second planarization layer 402. A part of the first planarization layer 401 is located between the passivation layer 403 and the light scattering layer 30, an other part of the first planarization layer 401 is located in the opening 31, and the second planarization layer 402 is located between the light source layer 20 and the passivation layer 403.

The first planarization layer 401 can play a role in planarizing the surface of the light scattering layer 30, and the second planarization layer 402 can play a role in planarizing a surface of the passivation layer 403, thereby preventing uneven heights and poor flatness from causing adverse impact on the transistor 50.

It should be noted that a material of the first planarization layer 401 and the second planarization layer 402 may be a resin material, and a material of the passivation layer 403 may be silicon dioxide. For example, the passivation layer 403 made of the silicon dioxide may be arranged on the first planarization layer 401 by evaporation, and the second planarization layer 402 made of the resin material may be arranged on the passivation layer 403 by coating.

In addition, in an optional implementation, at least one transistor 50 may be arranged in the second planarization layer 402, and the transistor 50 is in contact with the passivation layer 403.

Specifically, the transistor 50 may be a thin film transistor (Thin Film Transistor, TFT). The display assembly 100 having the TFT has advantages such as high responsivity, high brightness, high contrast, and the like, and has a better display effect.

As shown in FIG. 13, the display assembly 100 may further include a packaging layer 60. The light source layer 20 is located between the packaging layer 60 and the second planarization layer 402. A material of the packaging layer 60 may be silicon nitride, or the like. The packaging layer 60 can protect the light source layer 20, so as to prevent external conditions from affecting the light source layer 20, thereby avoiding damaging the use performance of the display assembly 100.

It may be understood that, in some embodiments, a bottom surface of the non-light-emitting layer 202 may be flush with a bottom surface of the light-emitting layer 201, a top surface of the non-light-emitting layer 202 may be higher than a top surface of the light-emitting layer 201. An inclined portion 2021 may be arranged on an end of the non-light-emitting layer 202 close to the light-emitting layer 201 (see FIG. 13), and a thickness of the inclined portion 2021 gradually decreases from an end away from the light-emitting layer 201 to an end close to the light-emitting layer 201. In this way, an emission angle of the emitted light on a side of the light-emitting layer 201 toward the packaging layer 60 can be increased, thereby increasing an emission range of the emitted light.

In the embodiment of this application, a thickness of the light scattering layer 30 ranges from 20 nm to 100 nm. For example, the thickness of the light scattering layer 30 may be 70 nm, 80 nm, or 90 nm, which is not limited in the embodiment of this application and is not limited to the above examples either. In this way, a thickness of the display assembly 100 can be reduced to a certain extent, which is beneficial to realize lightness and thinness of the display assembly 100 and further beneficial to realize lightness and thinness of the mobile phone 200 having the display assembly 100.

Specifically, in the embodiment of this application, a specific forming manner of the light scattering layer 30 includes but is not limited to the following two possible implementations.

Figure 14:
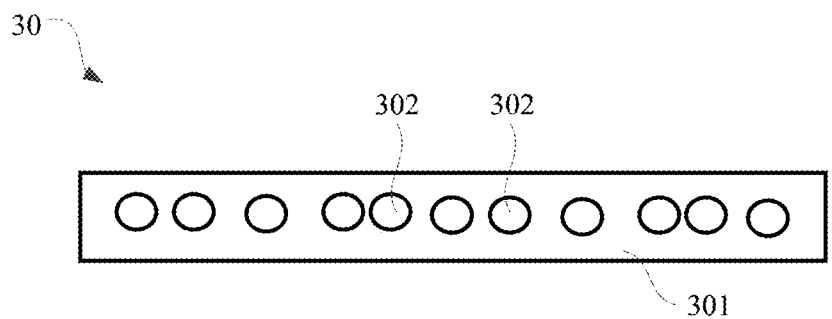
FIG. 14 is a schematic structural diagram of a light scattering layer in a display assembly according to an embodiment of this application.
Figure 15:
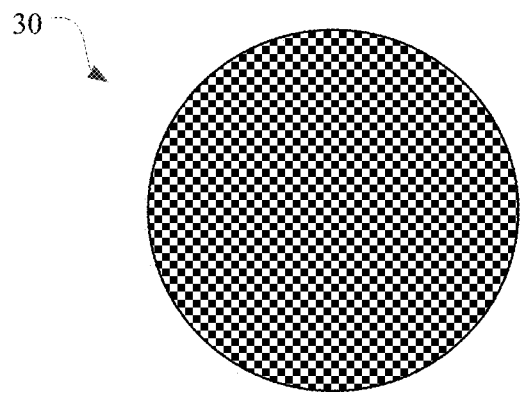
FIG. 15 is a schematic structural diagram of a light scattering layer in a display assembly according to an embodiment of this application.

A possible implementation is as follows. As shown in FIG. 14 and FIG. 15, the light scattering layer 30 may include a transparent substrate 301 and light scattering particles 302 distributed in the transparent substrate 301. A refractive index of the light scattering particles 302 is greater than a refractive index of the transparent substrate 301. In this way, the transparent substrate 301 coated by the light scattering particles 302 forms the light scattering layer 30, so as to scatter the emitted light.

It should be noted that the transparent substrate 301 may be made of a colloidal material such as photoresist and a resin material. For example, the transparent substrate 301 may be made of acrylic resin, polyimide resin, polyamide resin, or the like.

The light scattering particles 302 may be acrylic particles, Si particles, and made of organic materials such as poly(3, 4-ethylenedioxythiophene) (PEDOT), 4,4'-bis[N-(3-methylphenyl)-N-phenylamino]biphenyl (TPD), 4,4',4"-tris(N-carbazolyl)-triphenylamine (TCTA), and the like. Alternatively, in some other embodiments, the light scattering particles 302 may also be made of inorganic materials. The materials used by the transparent substrate 301 and the light scattering particles 302 are not limited in the embodiment of this application, and are not limited to the above examples either, as long as the transparent substrate and the light scattering particles have high refractive indexes and are not easily decomposed.

In the embodiment of this application, diameters of the light scattering particles 302 may range from 10 nm to 100 nm. The nano-scale light scattering particles 302 may be manufactured by using a method such as physical crushing or chemical deposition, and the light scattering particles 302 may be microscopic particles having a circular cross section or any shape. The nano-scale light scattering particles 302 are distributed in the transparent substrate 301, which can improve uniformity of the light scattering layer 30, thereby enhancing a scattering effect of the light scattering layer 30.

For example, diameters of the light scattering particles 302 may be 20 nm, 30 nm, 40 nm, and the like, which is not limited in the embodiment of this application and is not limited to the above examples either.

In addition, the light scattering particles 302 may be randomly distributed in the transparent substrate 301, and a doping proportion of the light scattering particles 302 in the transparent substrate 301 may range from 3% to 97%. It should be noted herein that the numerical value and the numerical range involved in this application are approximate values, and there may be an error within a certain range due to impact of the manufacturing process. The error may be considered negligible by those skilled in the art.

Figure 16:
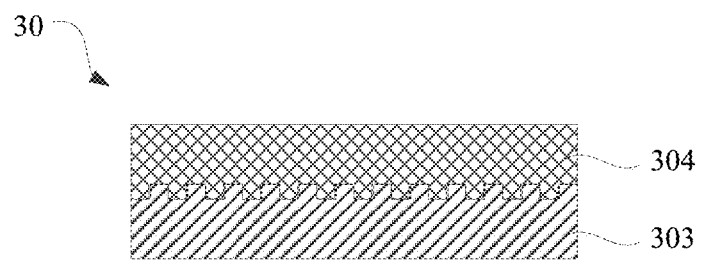
FIG. 16 is a schematic structural diagram of a light scattering layer in a display assembly according to an embodiment of this application.
Figure 17:
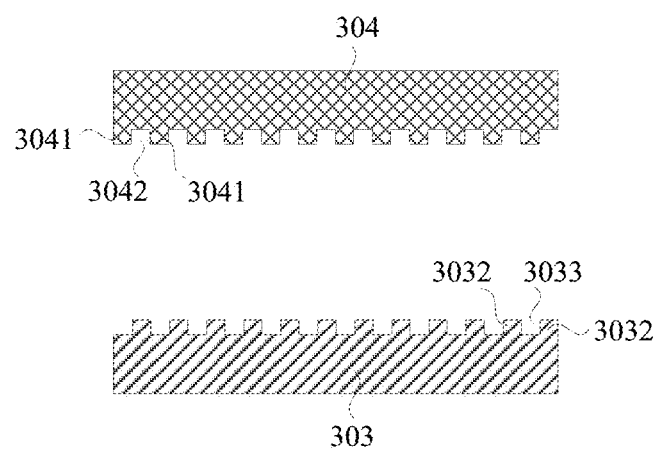
FIG. 17 is a schematic structural diagram of a first light scattering layer and a second light scattering layer in a light scattering layer according to an embodiment of this application.

Another possible implementation is as follows. As shown in FIG. 16, the light scattering layer 30 may include at least one set of a first light scattering layer 303 and a second light scattering layer 304 that are stacked. As shown in FIG. 17, a plurality of first protruding portions 3032 may be provided on a side of the first light scattering layer 303 close to the second light scattering layer 304, and a first groove 3033 is formed between two adjacent first protruding portions 3032. As shown in FIG. 17, a plurality of second protruding portions 3041 matching the first grooves 3033 may be provided on a side of the second light scattering layer 304 close to the first light scattering layer 303, a second groove 3042 is formed between two adjacent second protruding portions 3041, and the second grooves 3042 match the first protruding portions 3032. A refractive index of the first light scattering layer 303 is different from a refractive index of the second light scattering layer 304.

In this way, a level structure having alternating high and low refractive indexes is formed by the first light scattering layer 303 and the second light scattering layer 304. The light can be refracted on surfaces of concave-convex structures of the first light scattering layer 303 and the second light scattering layer 304, thereby changing a propagation direction of the light and realizing the effect of light scattering. The refractive index of the first light scattering layer 303 greater than the refractive index of the second light scattering layer 304 is used as an example. As shown by the black arrows in FIG. 18, the light first passes through the first light scattering layer 303 during irradiation, and then is refracted on the surface of the concave-convex structure of the first light scattering layer 303, thereby changing the propagation direction of the light and realizing the effect of light scattering.

In an optional implementation, at least part of the plurality of first protruding portions 3032 may have different shapes or sizes (see FIG. 31), and at least part of the plurality of second protruding portions 3041 may have different shapes or sizes. In this way, the surfaces of the concave-convex structures of the first light scattering layer 303 and the second light scattering layer 304 are in irregular shapes, which can further enhance the scattering effect of the light scattering layer 30.

Figure 18:
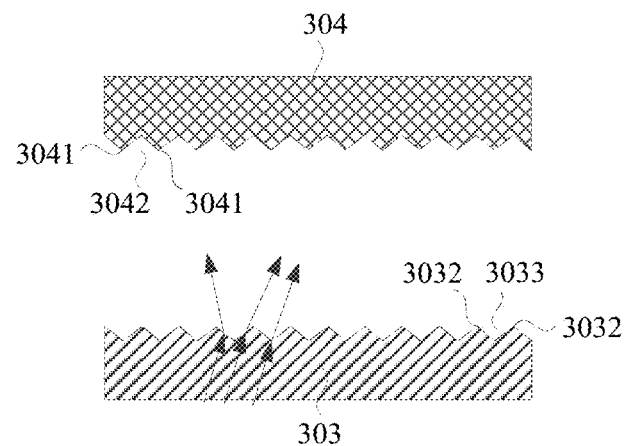
FIG. 18 is a schematic structural diagram of a first light scattering layer and a second light scattering layer in a light scattering layer according to an embodiment of this application.

In addition, it should be noted that the cross-sectional shape of the first protruding portion 3032 and the first groove 3033 may be a rectangle shown in FIG. 17, or a triangle shown in FIG. 18, which is not limited in the embodiment of this application and is not limited to the above examples either.

Figure 19:
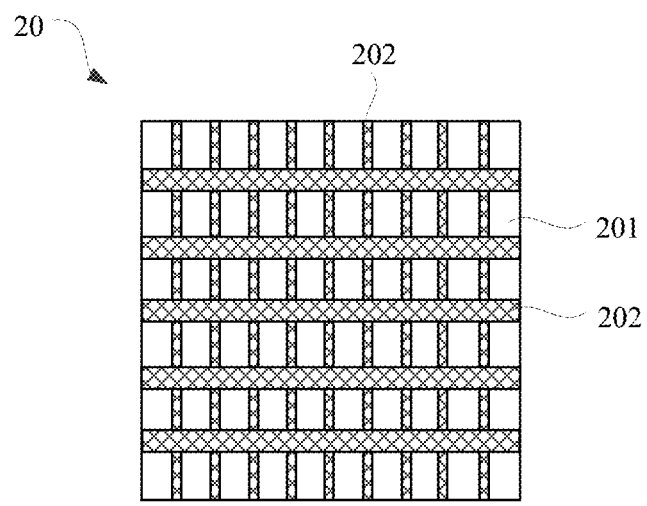
FIG. 19 is a schematic structural diagram of a light source layer in a display assembly according to an embodiment of this application.
Figure 20:
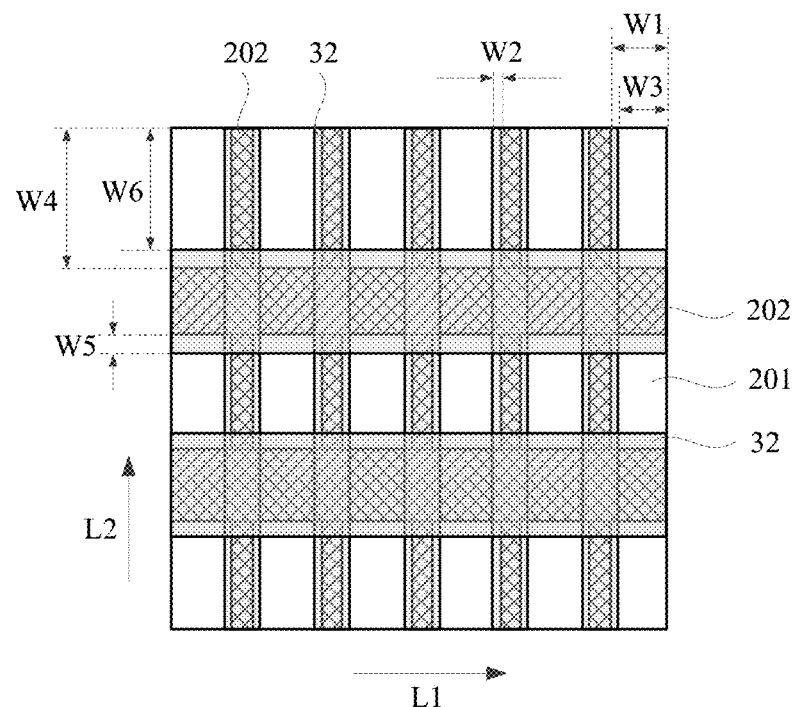
FIG. 20 is a schematic structural diagram of a light source layer and a light scattering layer in a display assembly according to an embodiment of this application.

In the embodiment of this application, as shown in FIG. 19, the light source layer 20 may include a plurality of light-emitting layers 201 and a plurality of non-light-emitting layers 202. The light-emitting layers 201 and the non-light-emitting layers 202 are arranged at intervals. Specifically, the light scattering layer 30 may include a plurality of scattering sub-layers 32. As shown in FIG. 20, projection regions of the plurality of scattering sub-layers 32 on the light source layer 20 may completely cover the plurality of non-light-emitting layers 202, and may cover a part of the plurality of light-emitting layers 201 adjacent to the plurality of non-light-emitting layers 202.

It is easy to understand that the non-light-emitting layer 202 may be a pixel defining layer, and a material of the pixel defining layer may be a resin material.

Still referring to FIG. 20, in the embodiment of this application, the light-emitting layers 201 and the non-light-emitting layers 202 may be arranged at intervals in a first direction L1. A width of a projection region of each of the scattering sub-layers 32 on each of the light-emitting layers 201 in the first direction L1 is greater than one fifth and less than four fifths of a width of each of the light-emitting layers 201 in the first direction L1.

Specifically, as shown in FIG. 20, the width of each of the light-emitting layers 201 in the first direction L1 is a first width W1, the width of the projection region of each of the scattering sub-layers 32 on each of the light-emitting layers 201 in the first direction L1 is a second width W2, and the width of a region of each of the light-emitting layers 201 not covered by the scattering sub-layer 32 in the first direction L1 is a third width W3. It is easy to understand that W1=W2+W3, that is to say, ⅕W1<W2<⅘W1, and ⅕W1<W3<⅘W1. That is to say, the third width W3 of the region of each of the light-emitting layers 201 not covered by the scattering sub-layer 32 in the first direction L1 is greater than one fifth and less than four fifths of the first width W1 of each of the light-emitting layers 201 in the first direction L1.

The light-emitting layers 201 and the non-light-emitting layers 202 may be arranged at intervals in a second direction L2. The width of the projection region of each of the scattering sub-layers 32 on each of the light-emitting layers 201 in the second direction L2 is greater than one fifth and less than four fifths of the width of each of the light-emitting layers 201 in the second direction L2. The second direction L2 is perpendicular to the first direction L1.

Specifically, as shown in FIG. 20, the width of each of the light-emitting layers 201 in the second direction L2 is a fourth width W4, the width of the projection region of each of the scattering sub-layers 32 on each of the light-emitting layers 201 in the second direction L2 is a fifth width W5, and a width of a region of each of the light-emitting layers 201 not covered by the scattering sub-layer 32 in the second direction L2 is a sixth width W6. It is easy to understand that W4=W5+W6, that is to say, ⅕W4<W5<⅘W4, and ⅕W4<W6<⅘W4. That is to say, the sixth width W6 of the region of each of the light-emitting layers 201 not covered by the scattering sub-layer 32 in the second direction L2 is greater than one fifth and less than four fifths of the fourth width W4 of each of the light-emitting layers 201 in the second direction L2.

In an optional implementation, the second width W2 of the projection region of each of the scattering sub-layers 32 on each of the light-emitting layers 201 in the first direction L1 and the fifth width W5 of the projection region of each of the scattering sub-layers 32 on each of the light-emitting layers 201 in the second direction L2 may be minimized. In this way, the impact on fingerprint imaging of the finger 300 is relatively small, and the fingerprint image collected by the optical recognition assembly 21 and fingerprint recognition features are not adversely affected.

Figure 21:
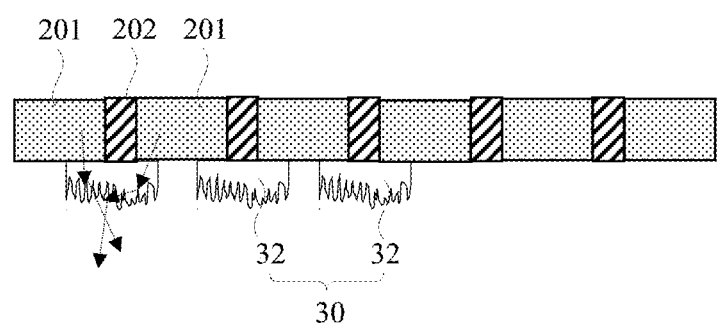
FIG. 21 is a schematic light-emitting diagram of a light scattering layer in a display assembly after scattering a light source layer according to an embodiment of this application.
Figure 22:
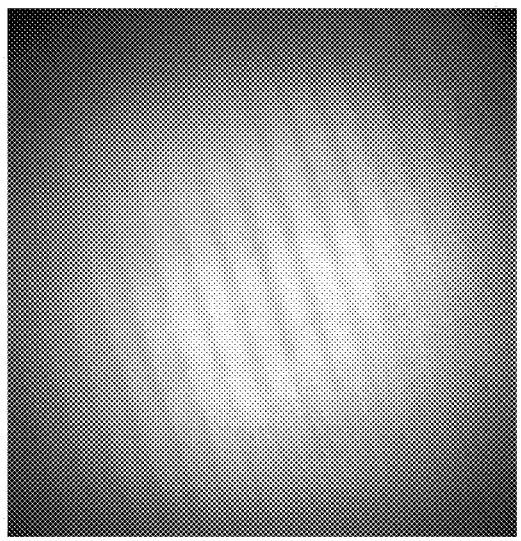
FIG. 22 is a diagram of a fingerprint image without a moiré pattern collected by an optical recognition assembly in an electronic device according to an embodiment of this application.

FIG. 21 shows a scattering principle of the light scattering layer 30. When light is emitted from an edge of the light-emitting layer 201, diffuse reflection occurs at the light scattering layer 30 (the scattering sub-layer 32), and divergent light in different directions is formed. Therefore, a light pattern at the non-light-emitting layer 202 is blurred. Viewed from a side of the light-emitting layer 201 facing the base layer 10, the emitted light tends to be continuous, thereby destroying the spatial high-frequency features of the imaging regularity of the light-emitting layer 201 in the optical recognition assembly 21. As shown in FIG. 22, the image collected by the optical recognition assembly 21 is no longer obviously "grainy" compared with those in FIG. 9 and FIG. 10, and is presented with evenly distributed bright spots, thereby avoiding optical space interference and effectively reducing generation of optical moiré patterns.

In addition, since the light scattering layer 30 is arranged on the side of the light-emitting layer 201 facing the base layer 10, the light scattering layer 30 will not have adverse impact on a front light exit display effect of the display assembly 100.

In addition, it may be understood that the region where the light scattering layer 30 is arranged in the display assembly 100 corresponds to the fingerprint detection region 120, so as to realize the function of enhancing the fingerprint detection accuracy.

Figure 23:
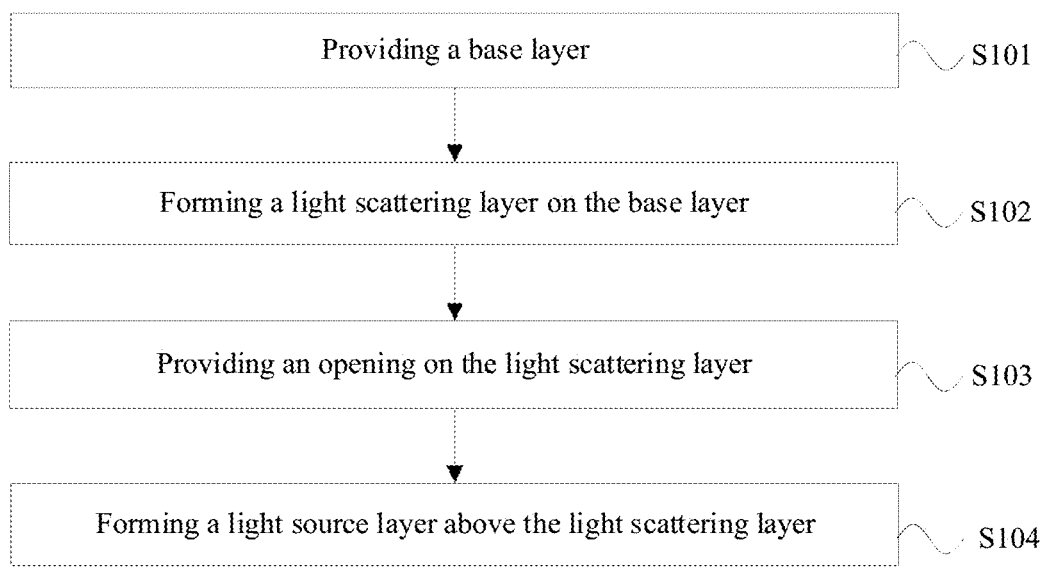
FIG. 23 is a schematic flowchart of a method for manufacturing a display assembly according to an embodiment of this application.

In addition, an embodiment of this application further provides a method for manufacturing a display assembly 100. As shown in FIG. 23, the method may include at least the following steps.

S101: Providing a base layer 10.

In the embodiment of this application, a material of the base layer 10 may be a glass base or a flexible material base. For example, the flexible material may be polyimide (Polyimide, PI). The polyimide has an excellent mechanical property, a dielectric property, a thermal expansion property, and a stability property.

S102: Forming a light scattering layer 30 on the base layer 10.

Figure 24:
FIG. 24 is a schematic structural diagram after forming a light scattering layer on a base layer in a method for manufacturing a display assembly according to an embodiment of this application.

Specifically, as shown in FIG. 24, the light scattering layer 30 is formed on the base layer 10. The light scattering layer 30 is a transparent substrate 301 coated by light scattering particles 302 by way of example. The transparent substrate 301 containing the light scattering particles 302 may be coated on the base layer 10, and the light scattering layer 30 formed by the transparent substrate 301 coated by the light scattering particles 302 is cured by using a curing process.

S103: Providing an opening 31 on the light scattering layer 30.

Figure 25:
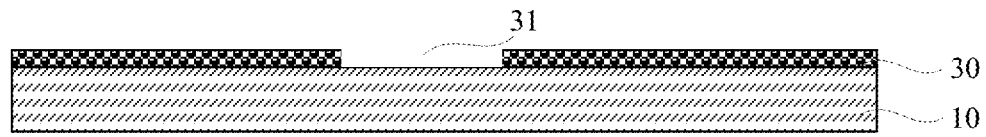
FIG. 25 is a schematic structural diagram after providing an opening on a light scattering layer in a method for manufacturing a display assembly according to an embodiment of this application.

Specifically, as shown in FIG. 25, the opening 31 may be provided on the light scattering layer 30 by using an etching process. It should be noted that a shape of the opening 31 may be any pattern, that is to say, the pattern required in an actual application scenario may be obtained by using the etching process.

S104: Forming a light source layer 20 above the light scattering layer 30.

The light source layer 20 may include a light-emitting layer 201 and non-light-emitting layers 202 located on two sides of the light-emitting layer 201. A projection region of the light-emitting layer 201 on the light scattering layer 30 covers the opening 31, and a projection region of a connection region 203 between the non-light-emitting layer 202 and the light-emitting layer 201 on the light scattering layer 30 is located outside the opening 31.

Based on the principle of light scattering, when light on a side of the light-emitting layer 201 toward the base layer 10 is emitted from an edge of the opening 31, diffuse reflection occurs on the light scattering layer 30 to form divergent light in different directions. In this way, the light scattering layer 30 blurs the scattered light. The image collected by the optical recognition assembly 21 is not obviously "grainy" and is presented with evenly distributed bright spots. Therefore, optical space interference is avoided, and occurrence of an optical fingerprint moiré pattern is effectively reduced or avoided, thereby enhancing the accuracy of fingerprint recognition and greatly improving use performance and user experience.

Figure 26:
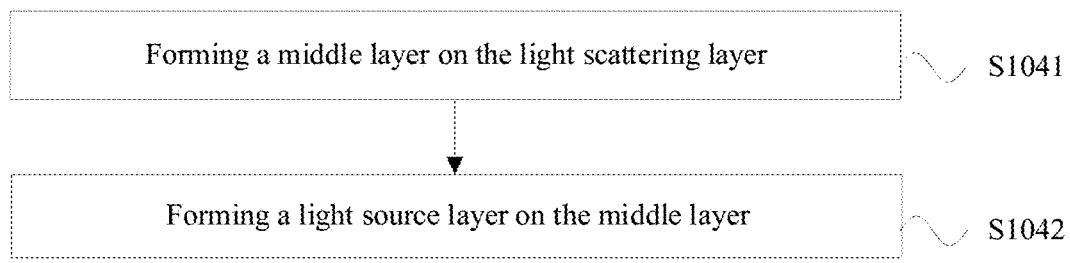
FIG. 26 is a schematic flowchart of a method for manufacturing a display assembly according to an embodiment of this application.

In the embodiment of this application, as shown in FIG. 26, S104 may specifically include the following steps.

S1041: Forming a middle layer 40 on the light scattering layer 30.

Figure 27:
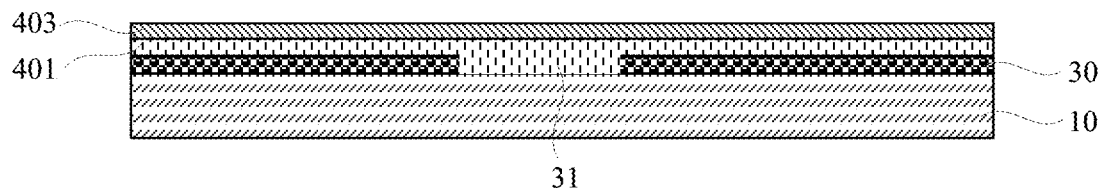
FIG. 27 is a schematic structural diagram after forming a middle layer (a first planarization layer and a passivation layer) on a light scattering layer in a method for manufacturing a display assembly according to an embodiment of this application.

For example, as shown in FIG. 27, a first planarization layer 401 may be formed on the light scattering layer 30, and a passivation layer 403 is formed on the first planarization layer 401. The first planarization layer 401 can play a role in planarizing a surface of the light scattering layer 30, and the passivation layer can play the role in thermal insulation and blocking ion erosion.

In addition, a second planarization layer 402 may be further formed on the passivation layer 403, and at least one transistor 50 is arranged in the second planarization layer 402. The transistor 50 is in contact with the passivation layer 403.

It should be noted that a material of the first planarization layer 401 and the second planarization layer 402 may be a resin material, and a material of the passivation layer 403 may be silicon dioxide. For example, the passivation layer 403 made of the silicon dioxide may be arranged on the first planarization layer 401 by evaporation, and the second planarization layer 402 made of the resin material may be arranged on the passivation layer 403 by coating.

The transistor 50 may be a thin film transistor (Thin Film Transistor, TFT).

The display assembly 100 having the TFT has advantages such as high responsivity, high brightness, high contrast, and the like, and has a better display effect.

S1042: Forming a light source layer 20 on the middle layer 40.

A part of the middle layer 40 is located between the light source layer 20 and the light scattering layer 30, and an other part of the middle layer 40 is located in opening 31.

It should be noted that, in the embodiment of this application, the forming a light scattering layer 30 on the base layer 10 may specifically include but is not limited to the following two possible implementations.

Figure 28:
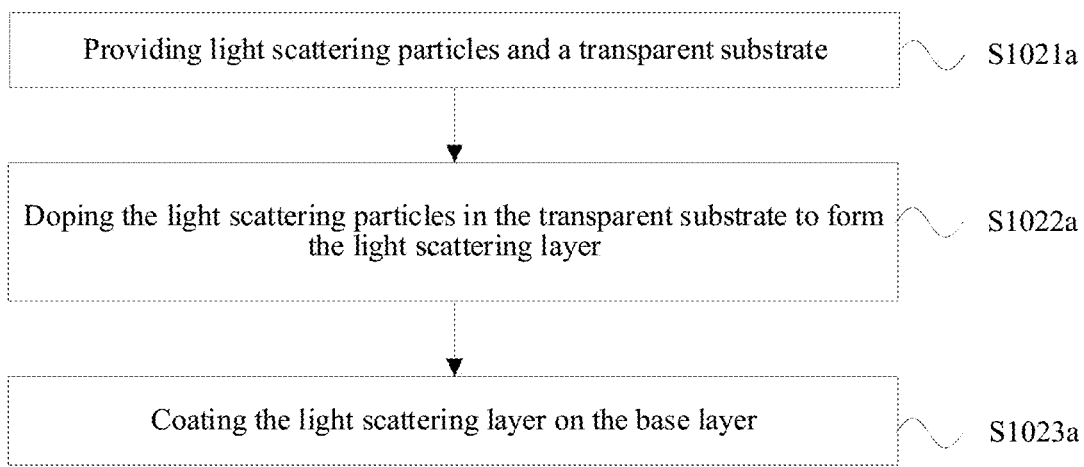
FIG. 28 is a schematic flowchart of forming a light scattering layer on a base layer in a method for manufacturing a display assembly according to an embodiment of this application.

A possible implementation is as follows. As shown in FIG. 28, S102 may specifically include the following steps.

S1021a: Providing light scattering particles 302 and a transparent substrate 301.

It should be noted that the transparent substrate 301 may be made of a colloidal material such as photoresist and a resin material. For example, the transparent substrate 301 may be made of acrylic resin, polyimide resin, polyamide resin, or the like.

The light scattering particles 302 may be acrylic particles, Si particles, and made of organic materials such as poly(3, 4-ethylenedioxythiophene) (PEDOT), 4,4'-bis[N-(3-methylphenyl)-N-phenylamino]biphenyl (TPD), 4,4',4''-tris(N-carbazolyl)-triphenylamine (TCTA), and the like. The materials used by the transparent substrate 301 and the light scattering particles 302 are not limited in the embodiment of this application, and are not limited to the above examples either.

S1022a: Doping the light scattering particles 302 in the transparent substrate 301 to form the light scattering layer 30.

It should be noted that a doping proportion of the light scattering particles 302 in the transparent substrate 301 may range from 3% to 97%.

S1023a: Coating the light scattering layer 30 on the base layer 10.

A refractive index of the light scattering particles 302 is greater than a refractive index of the transparent substrate 301. In this way, the transparent substrate 301 coated by the light scattering particles 302 forms the light scattering layer 30, so as to scatter the emitted light.

Figure 29:
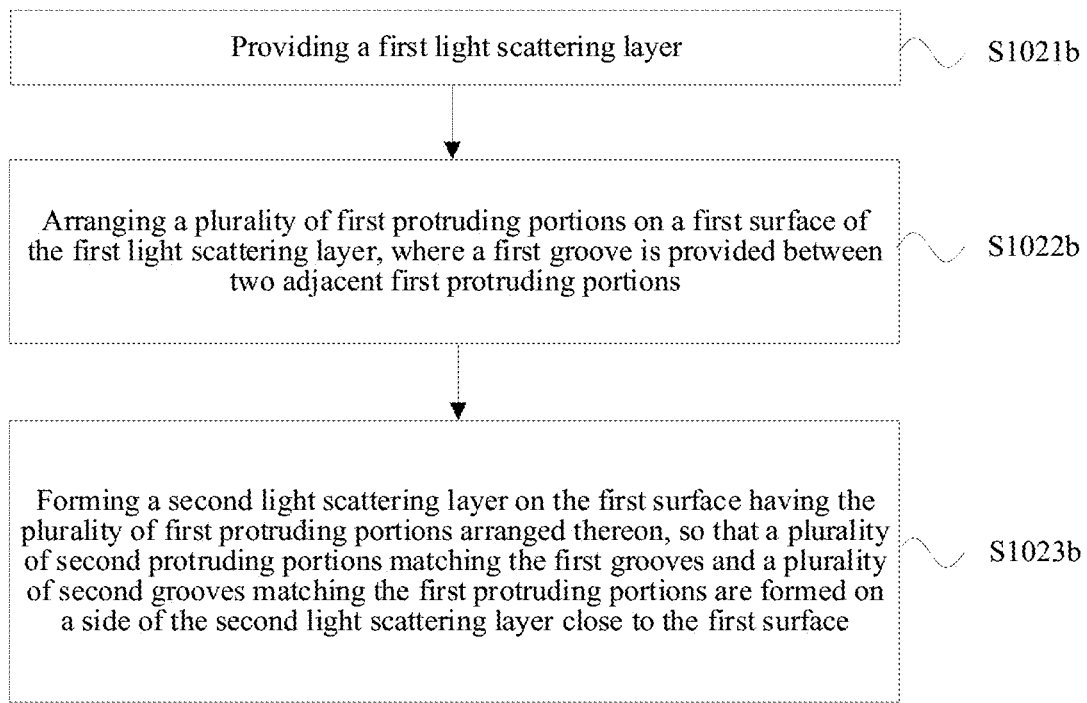
FIG. 29 is a schematic flowchart of forming a light scattering layer on a base layer in a method for manufacturing a display assembly according to an embodiment of this application.

Another possible implementation is as follows. As shown in FIG. 29, S102 may specifically include the following steps.

S1021b: Providing a first light scattering layer 303.

Figure 30:
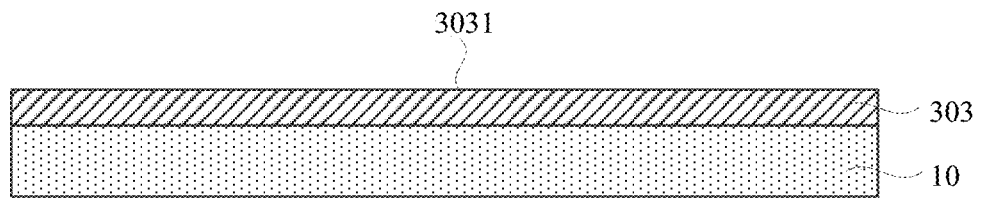
FIG. 30 is a schematic structural diagram after forming a first light scattering layer on a base layer in a method for manufacturing a display assembly according to an embodiment of this application.

Specifically, as shown in FIG. 30, the first light scattering layer 303 is formed on the base layer 10.

S1022b: Arranging a plurality of first protruding portions 3032 on a first surface 3031 of the first light scattering layer 303, where a first groove 3033 is provided between two adjacent first protruding portions 3032.

Figure 31:
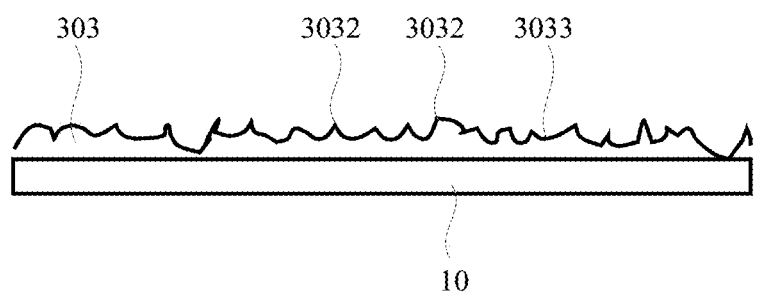
FIG. 31 is a schematic structural diagram after forming a first protruding portion and a first groove on a first light scattering layer in a method for manufacturing a display assembly according to an embodiment of this application.

Specifically, as shown in FIG. 30 and FIG. 31, a plurality of first protruding portions 3032 are provided on the first surface 3031 of the first light scattering layer 303, so that a first groove 3033 is formed between two adjacent first protruding portions 3032. It should be noted that the first protruding portions 3032 and the first grooves 3033 may be formed on the first light scattering layer 303 by using a nanoindentation process.

S1023b: Forming a second light scattering layer 304 on the first surface 3031 having the plurality of first protruding portions 3032 arranged thereon, so that a plurality of second protruding portions 3041 matching the first grooves 3033 and a plurality of second grooves 3042 matching the first protruding portions 3032 are formed on a side of the second light scattering layer 304 close to the first surface 3031.

Figure 32:
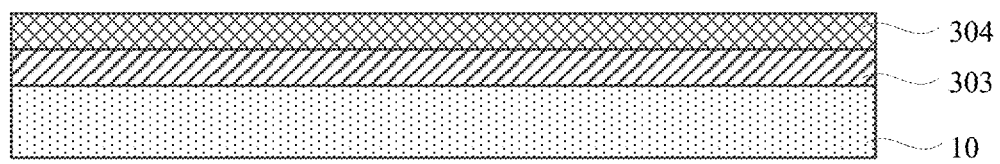
FIG. 32 is a schematic structural diagram after forming a second light scattering layer on a first light scattering layer in a method for manufacturing a display assembly according to an embodiment of this application.

Specifically, as shown in FIG. 32, the second light scattering layer 304 is formed on the first light scattering layer 303. Since a plurality of first protruding portions 3032 and a plurality of first grooves 3033 are provided on the first surface 3031 of the first light scattering layer 303, when the second light scattering layer 304 is arranged on the first surface 3031 of the first light scattering layer 303, a plurality of second protruding portions 3041 matching the first grooves 3033 and a plurality of second grooves 3042 matching the first protruding portions 3032 are formed on the side of the second light scattering layer 304 close to the first surface 3031 (refer to FIG. 17 and FIG. 18).

It should be noted that, in the embodiment of this application, a refractive index of the first light scattering layer 303 is different from a refractive index of the second light scattering layer 304.

In this way, a level structure having alternating high and low refractive indexes is formed by the first light scattering layer 303 and the second light scattering layer 304. The light can be refracted on surfaces of concave-convex structures of the first light scattering layer 303 and the second light scattering layer 304, thereby changing a propagation direction of the light and realizing the effect of light scattering.

In the description of the embodiments of this application, it should be noted that, unless otherwise explicitly specified and defined, the terms "mount", "connected", and "connection" should be understood in a broad sense, for example, fixed connection, indirectly connected by a medium, or internal communication between two elements, or an interaction relationship between the two elements. The specific meanings of the above terms in the embodiments of this application may be understood according to specific circumstances for those of ordinary skill in the art.

The apparatus or element indicated or implied in the embodiments of this application is required to have a specific orientation, be constructed and operate in the specific orientation, and therefore should not be construed as a limitation on the embodiments of this application. In the description of the embodiments of this application, unless otherwise accurately specifically specified, "a plurality of" means two or more than two.

The terms such as "first", "second", "third", and "fourth" (if any) in the specification and claims of the embodiments of this application and in the accompanying drawings are used for distinguishing similar objects and not necessarily used for describing any particular order or sequence. It is to be understood that data used in this way is interchangeable in a suitable case, so that the embodiments of the embodiments of this application described herein can be implemented in a sequence in addition to the sequence shown or described herein. Moreover, the terms "may comprise", "include", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

Finally, it should be noted that: the foregoing embodiments are merely intended for describing other than limiting the technical solutions of the embodiments of this application. Although the embodiments of this application are described in detail with reference to the foregoing embodiments, persons of ordinary skill in the art should understand that: modifications may be made to the technical solutions described in the foregoing embodiments, or equivalent replacements may be made to some or all technical features in the technical solutions, as long as such modifications or replacements do not cause the essence of corresponding technical solutions to depart from the scope of the technical solutions of the embodiments of this application.

What is claimed is:

1. A display assembly, applicable to an electronic device having a fingerprint recognition function, the display assembly comprising at least:
  a base layer, a light source layer, and a light scattering layer located between the base layer and the light source layer, wherein
  the light source layer comprises a light-emitting layer and non-light-emitting layers located on two sides of the light-emitting layer; and
  an opening is located on the light scattering layer, a projection region of the light-emitting layer projected onto the light scattering layer covers the opening of the light scattering layer, and a projection region of a connection region formed between the non-light-emitting layer and the light-emitting layer projected onto the light scattering layer is located outside the opening, wherein the light scattering layer comprises at least one set of a first light scattering layer and a second light scattering layer that are stacked, wherein
  a plurality of first protruding portions are located on a side of the first light scattering layer close to the second light scattering layer, and a first groove is formed between two adjacent first protruding portions;
  a plurality of second protruding portions matching the first grooves are located on a side of the second light scattering layer close to the first light scattering layer, a second groove is formed between two adjacent second protruding portions, and the second grooves match the first protruding portions; and
  a refractive index of the first light scattering layer is different from a refractive index of the second light scattering layer.

2. The display assembly according to claim 1, wherein the light scattering layer comprises a transparent substrate and light scattering particles distributed in the transparent substrate, wherein
  a refractive index of the light scattering particles is greater than a refractive index of the transparent substrate.

3. The display assembly according to claim 1, wherein the light source layer comprises a plurality of light-emitting layers and a plurality of non-light-emitting layers, wherein the light-emitting layers and the non-light-emitting layers are arranged at intervals; and
  the light scattering layer comprises a plurality of scattering sub-layers, and projection regions of the plurality of scattering sub-layers projected onto the light source layer completely cover the plurality of non-light-emitting layers, and cover a part of the plurality of light-emitting layers adjacent to the plurality of non-light-emitting layers.

4. The display assembly according to claim 3, wherein the light-emitting layers and the non-light-emitting layers are arranged at intervals in a first direction; and
  a width of a projection region of each of the scattering sub-layers on each of the light-emitting layers in the first direction is greater than one fifth and less than four fifths of a width of each of the light-emitting layers in the first direction.

5. The display assembly according to claim 4, wherein the light-emitting layers and the non-light-emitting layers are arranged at intervals in a second direction; and
   a width of a projection region of each of the scattering sub-layers on each of the light-emitting layers in the second direction is greater than one fifth and less than four fifths of a width of each of the light-emitting layers in the second direction, wherein
   the second direction is perpendicular to the first direction.

6. The display assembly according to claim 1, further comprising: a middle layer, wherein the middle layer is located between the base layer and the light source layer; and
   a part of the middle layer is located between the light source layer and the light scattering layer, and another part of the middle layer is located in the opening.

7. The display assembly according to claim 6, wherein the middle layer comprises at least one planarization layer, wherein a part of the planarization layer is located between the light source layer and the light scattering layer, and another part of the planarization layer is located in the opening.

8. The display assembly according to claim 7, wherein the middle layer comprises at least two planarization layers and at least one passivation layer, wherein
   the passivation layer is located between two adjacent planarization layers; and
   a first of the at least two planarization layers is located between the light source layer and the planarization layer, a part of a second of the at least two planarization layers is located between the passivation layer and the light scattering layer, and another part of the second of the at least two planarization layers is located in the opening.

9. The display assembly according to claim 8, wherein the middle layer comprises a first planarization layer, a second planarization layer, and a passivation layer located between the first planarization layer and the second planarization layer, wherein
   a part of the first planarization layer is located between the passivation layer and the light scattering layer, and another part of the first planarization layer is located in the opening; and
   the second planarization layer is located between the light source layer and the passivation layer, at least one transistor is arranged in the second planarization layer, and the transistor is in contact with the passivation layer.

10. The display assembly according to claim 9, further comprising a packaging layer, wherein the light source layer is located between the packaging layer and the second planarization layer.

11. The display assembly according to claim 1, wherein a bottom surface of the non-light-emitting layer is flush with a bottom surface of the light-emitting layer, and a top surface of the non-light-emitting layer is higher than a top surface of the light-emitting layer; and
   an inclined portion is arranged on an end of the non-light-emitting layer close to the light-emitting layer, and a thickness of the inclined portion gradually decreases from an end away from the light-emitting layer to an end close to the light-emitting layer.

12. The display assembly according to claim 1, wherein a thickness of the light scattering layer ranges from 20 nm to 100 nm.

13. An electronic device, comprising at least: a middle frame, an optical recognition assembly, and the display assembly according to claim 1, wherein
   the optical recognition assembly is located between the display assembly and the middle frame.

14. The electronic device according to claim 13, wherein the optical recognition assembly comprises a lens and a sensor, wherein
   the lens is located between the display assembly and the sensor; and
   a fingerprint detection region is arranged on the display assembly, and a projection region of the fingerprint detection region projected onto the middle frame at least partially coincides with a projection region of the lens projected onto the middle frame.

15. A display assembly, applicable to an electronic device having a fingerprint recognition function, the display assembly comprising at least:
   a base layer, a light source layer, and a light scattering layer located between the base layer and the light source layer, wherein
   the light source layer comprises a light-emitting layer and non-light-emitting layers located on two sides of the light-emitting layer; and
   an opening is located on the light scattering layer, a projection region of the light-emitting layer projected onto the light scattering layer covers the opening of the light scattering layer, and a projection region of a connection region formed between the non-light-emitting layer and the light-emitting layer projected onto the light scattering layer is located outside the opening,
   wherein the light source layer comprises a plurality of light-emitting layers and a plurality of non-light-emitting layers, wherein the light-emitting layers and the non-light-emitting layers are arranged at intervals, and wherein the light scattering layer comprises a plurality of scattering sub-layers, and projection regions of the plurality of scattering sub-layers projected onto the light source layer completely cover the plurality of non-light-emitting layers, and cover a part of the plurality of light-emitting layers adjacent to the plurality of non-light-emitting layers.

16. The display assembly according to claim 15, wherein the light scattering layer comprises a transparent substrate and light scattering particles distributed in the transparent substrate, wherein
   a refractive index of the light scattering particles is greater than a refractive index of the transparent substrate.

17. The display assembly according to claim 15, wherein a thickness of the light scattering layer ranges from 20 nm to 100 nm.

18. A display assembly, applicable to an electronic device having a fingerprint recognition function, the display assembly comprising at least:
   a base layer, a light source layer, and a light scattering layer located between the base layer and the light source layer, wherein
   the light source layer comprises a light-emitting layer and non-light-emitting layers located on two sides of the light-emitting layer; and
   an opening is located on the light scattering layer, a projection region of the light-emitting layer projected onto the light scattering layer covers the opening of the light scattering layer, and a projection region of a connection region formed between the non-light-emitting layer and the light-emitting layer projected onto the light scattering layer is located outside the opening;

wherein a middle layer is located between the base layer and the light source layer, and a part of the middle layer is located between the light source layer and the light scattering layer, and another part of the middle layer is located in the opening;

or wherein a bottom surface of the non-light-emitting layer is flush with a bottom surface of the light-emitting layer, a top surface of the non-light-emitting layer is higher than a top surface of the light-emitting layer, an inclined portion is arranged on an end of the non-light-emitting layer close to the light-emitting layer, and a thickness of the inclined portion gradually decreases from an end away from the light-emitting layer to an end close to the light-emitting layer.

19. The display assembly according to claim 18, wherein the light scattering layer comprises a transparent substrate and light scattering particles distributed in the transparent substrate, wherein a refractive index of the light scattering particles is greater than a refractive index of the transparent substrate.

20. The display assembly according to claim 18, wherein a thickness of the light scattering layer ranges from 20 nm to 100 nm.

\* \* \* \* \*